US012722282B1

(12) United States Patent
Mangelsen et al.

(10) Patent No.: US 12,722,282 B1
(45) Date of Patent: Sep. 1, 2026

(54) INDEX PADDLES FOR A ROBOTIC WORKSTATION CENTERED ON A ROTATING POSITIONER TABLE

(71) Applicant: ARRAYCORE AUTOMATION, LLC, Grand Mound, IA (US)

(72) Inventors: Chris Mangelsen, Charlotte, IA (US); Kevin Thomas McClung, Eldridge, IA (US); Terry Daggett, Blue Grass, IA (US); Richard Dean Rohret, Bettendorf, IA (US)

(73) Assignee: ARRAYCORE AUTOMATION, LLC, Grand Mound, IA (US)

( * ) Notice: Subject to any disclaimer, the term of this patent is extended or adjusted under 35 U.S.C. 154(b) by 0 days.

(21) Appl. No.: 19/257,120

(22) Filed: Jul. 1, 2025

(51) Int. Cl.
*B25J 9/00* (2006.01)
*B25J 9/10* (2006.01)
*B25J 9/14* (2006.01)

(52) U.S. Cl.
CPC ........... *B25J 9/0009* (2013.01); *B25J 9/0087* (2013.01); *B25J 9/108* (2013.01); *B25J 9/14* (2013.01)

(58) Field of Classification Search
CPC ........ B25J 9/0009; B25J 9/0087; B25J 9/043; B25J 9/10; B25J 9/106
See application file for complete search history.

(56) References Cited

U.S. PATENT DOCUMENTS 5,083,070 A 1/1992 Poupard et al.
9,457,464 B2 * 10/2016 Kremerman ............. B25J 9/042
12,131,939 B2 * 10/2024 Lee ..................... H10P 72/7602
12,338,081 B2 * 6/2025 Fujisawa .................. B25J 9/106
2022/0063030 A1 * 3/2022 Choi ..................... B23P 19/007
2025/0010465 A1 * 1/2025 Iwasaki .................... B25J 9/043

FOREIGN PATENT DOCUMENTS

CN 105531086 A * 4/2016 .......... H10P 72/3302
CN 107000202 B * 3/2020 .............. B25J 9/126
CN 116985102 A * 11/2023 .............. B25J 9/043
JP 2771134 B2 * 7/1998 ............ B25J 9/0087
TW 1832387 B * 2/2024 .......... H10P 72/7608

OTHER PUBLICATIONS

EIC 3600 STIC Search Report (Year: 2026).*

* cited by examiner

*Primary Examiner* — Bobby Rushing, Jr.
(74) *Attorney, Agent, or Firm* — SHUTTLEWORTH & INGERSOLL, PLC; Jason R. Sytsma

(57) ABSTRACT

An adapter plate attached to the top of the riser, with a surface area extending outward from the top of the riser to provide the surface area larger than a perimeter of the top of the riser; a first guide mounted off-center of the adapter plate on a first side of the adapter plate; a first index paddle movably mounted on the first guide, comprising an extending portion that extends off-center of the first index paddle and configured for receiving a first robotic arm; and a first actuator for moving the first index paddle with respect to the adapter plate between an inward position and an outward position, wherein the extending portion in the outward position projects farther from the riser than in the inward position to extend a reach of the first robotic arm.

17 Claims, 5 Drawing Sheets

INDEX PADDLES FOR A ROBOTIC WORKSTATION CENTERED ON A ROTATING POSITIONER TABLE

TECHNICAL FIELD

The present invention relates generally to robotic workstations and, more particularly, to a robotic workstation comprising a pair of off-center indexing paddles mounted on a riser centered on a rotating positioner table, each supporting a robot, and controlled by a computerized robot controller to achieve an extended range of robot movement over a larger work area.

BACKGROUND INFORMATION

Computer-controlled robots have become indispensable in modern manufacturing and fabrication industries, performing tasks such as welding, drilling, cutting, and assembly with high precision and efficiency. There remains a need in the art for improving the efficiency of a robotic workstation. Specifically, there is a demand for a configuration that provides an extended range of robot movement over a larger work area, enhances operational efficiency, and maintains a compact footprint suitable for modern manufacturing environments.

SUMMARY

Disclosed is a robotic workstation support structure for positioning in center of pair of rotating work cells, enabling efficient manufacturing operations such as welding, drilling, or assembly. Robotic workstation comprises riser with top and bottom, supporting adapter plate that extends outward to provide surface area larger than perimeter of riser's top. First bearing and second bearing are mounted off-center on opposite sides of adapter plate, each supporting first index paddle and second index paddle, respectively. Each index paddle includes extending portion configured to receive first robotic arm or second robotic arm, positioned off-center to enhance reach. First actuator rotates first index paddle, and second actuator rotates second index paddle with respect to adapter plate, facilitating precise positioning of robotic arms within respective work cells for continuous workflow.

In an embodiment, the robotic workstation comprises of a positioner table mounted on an bearing having an open center with the riser mounted therein. The positioner is mounted on the rotating portion of the bearing, wherein the positioner is configured for movement between a working position, wherein the first robotic arm can carry out work on a work piece, and an open position, wherein the work piece can be unloaded.

In an embodiment, a robotic workstation support structure further includes features to optimize functionality and flexibility across various embodiments. First actuator and second actuator are configured to rotate corresponding first index paddle and second index paddle ninety degrees, moving between an inward position for reaching workpieces near the center of the work cell and an outward position for operations, with extending portion in extended position projecting outward to extend reach of robotic arm.

Alternatively, robotic workstation encompasses broader movement of index paddle between inward position and outward position via first actuator, with dependent variations specifying rotational, linear, or arcuate paths along first guide, where movement to outward position enhances reach and corresponds to inward and outward positions. Additional features include pneumatic cylinder as actuator type, ensuring reliable actuation, and adapter plate with first hole aligned with through-hole in index paddle to create channel for robotic arm wiring, facilitating connectivity. Rotational or movement axes of index paddles are offset from longitudinal axis of riser, maximizing workspace coverage across 180-degree work area while the other work area can be loaded and unloaded allowing the operator to remain stationary with the work areas rotating to the operator.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
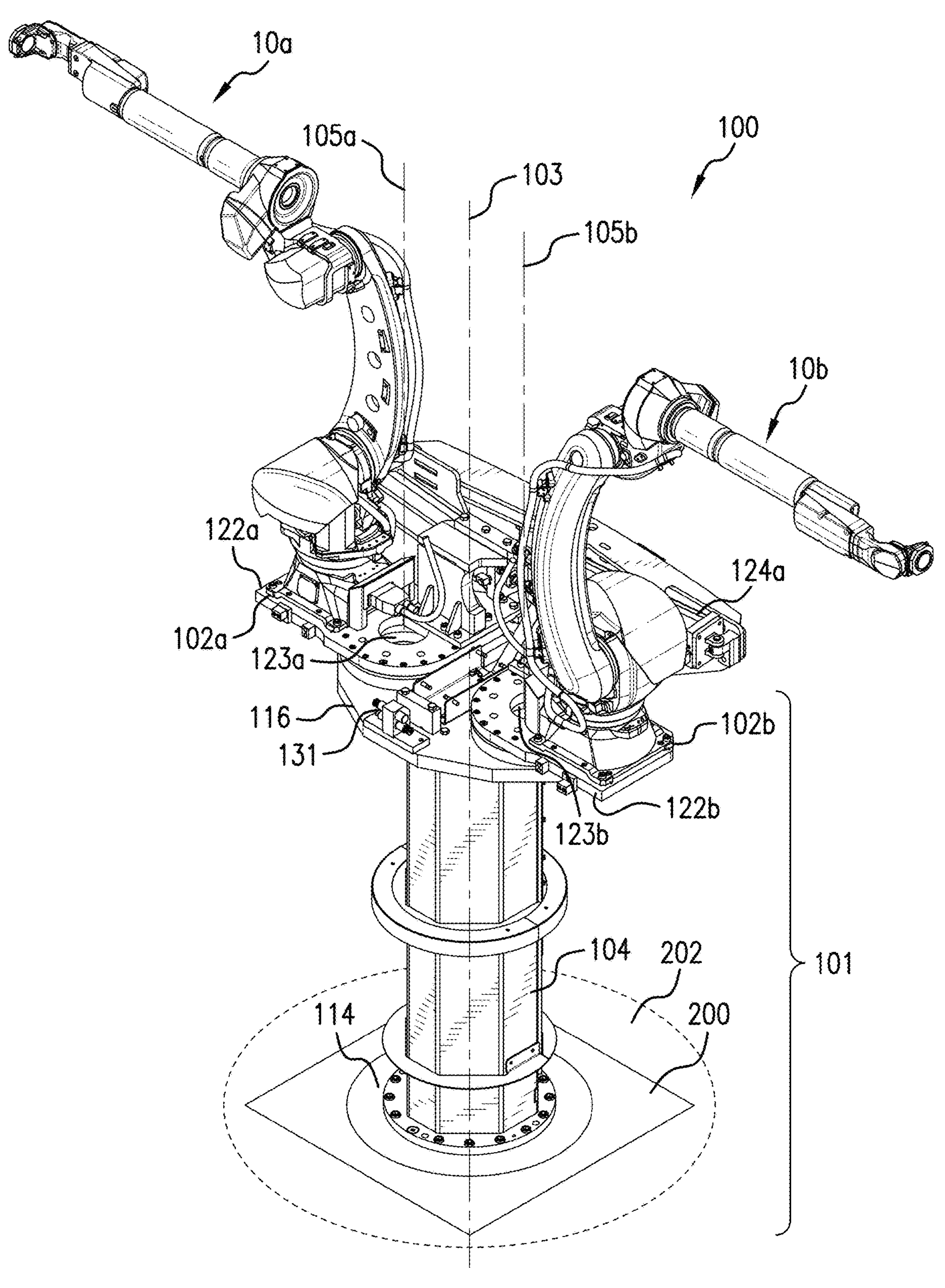
FIG. 1 is a perspective view of off-center index paddles and robots in accord with the concepts of this disclosure.

FIG. 1 shows a robotic work station 100 according to this disclosure. Robotic work station 100 comprises, generally, of a pair of robotic arms 10 (10*a*, 10*b*) each rotatably mounted on a robotic workstation support structure 101 with a pair of corresponding index paddles 102 (102*a*, 102*b*) mounted off-center of a centralized support riser 104. With robotic workstation support structure 101 being centrally located in the center of a work area, pair of robotic arms 10*a*, 10*b* can serve a 180 degree relation from central riser 104 with each index paddles 102*a*, 102*b* serving 90 degree relation thereto. Each of index paddles 102 are off-center of riser 104 giving each robotic arm 10*a*, 10*b* a greater reach of operation. When operations are completed on one work cell, a rotating positioner table 200 rotates the other work cell 180 degrees into position, and the completed work cell is rotated back to the operator for unloading and reloading.

Figure 3:
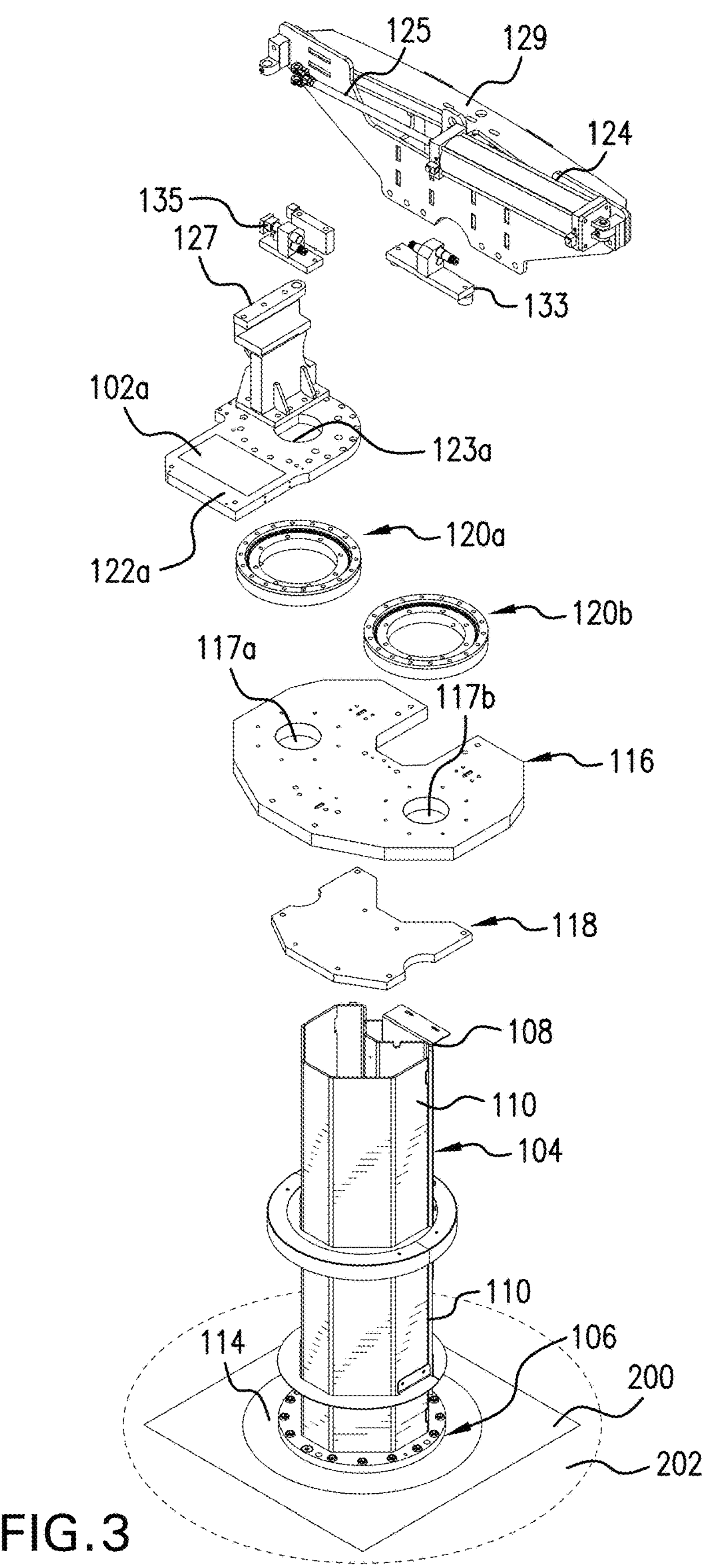
FIG. 3 is an exploded view of the off-center index paddles and robots of FIG. 1.

Referring to FIG. 3, riser 104 forms the central structural core of robotic workstation support structure 101. Riser 104 is an elongated, rigid member extending vertically from a bottom end 106 to a top end 108, defining a longitudinal axis 103 substantially perpendicular to the floor or work area base and corresponding to a central axis of riser 104. Riser 104 is configured to facilitate uniform load distribution and compatibility with rotational components, but may have a polygonal (e.g., square, hexagonal) cross-section in alternative embodiments to enhance mounting stability or aesthetic integration. Riser 104 can be configured in sections that are mounted together by flanges to provide a variety of heights depending on the application. Riser 104 is constructed from a high-strength material, such as steel or aluminum alloy, to support the weight of index paddles 102*a*, 102*b*, robotic arms 10*a*, 10*b*, and associated components under dynamic operational loads.

Figure 2A:
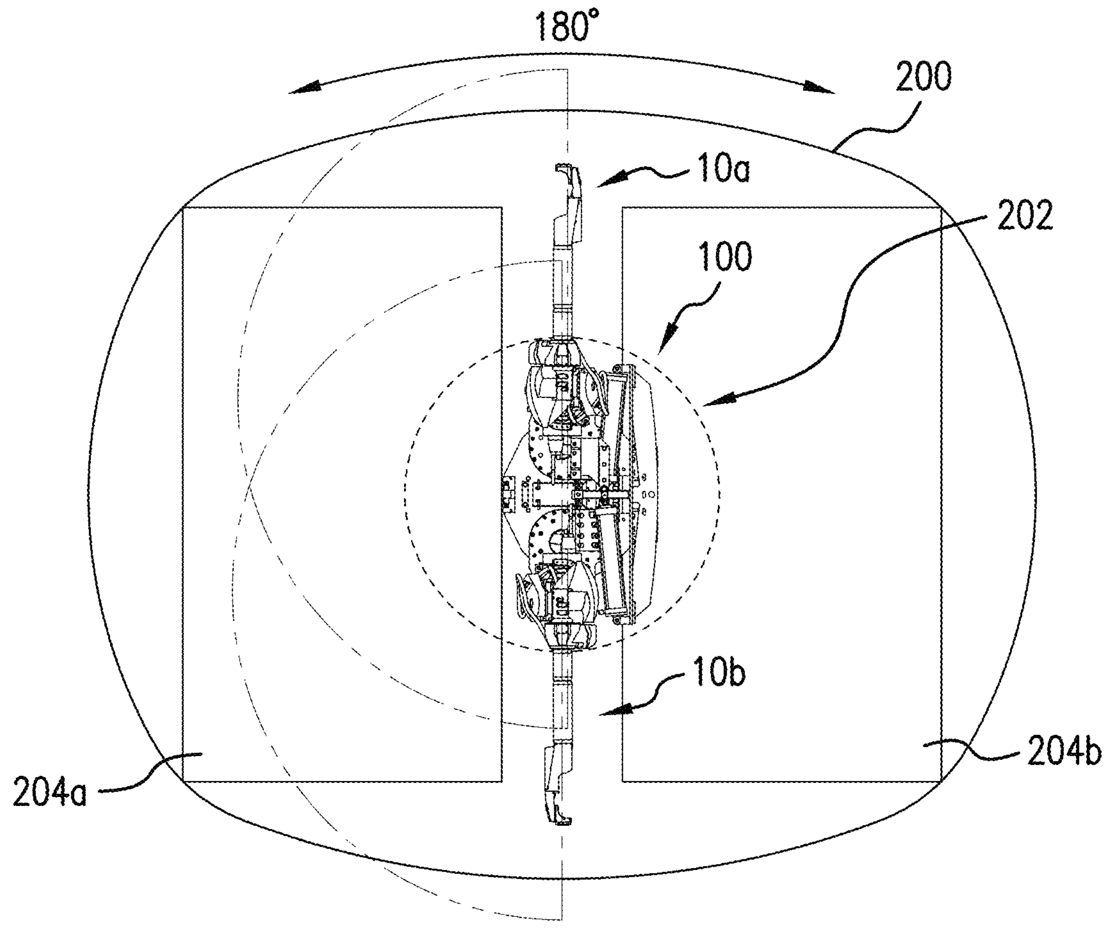
FIG. 2A is a top view of a workstation with the off-center index paddles in the inward position where the robots are oriented for inward reach closer to the riser.
Figure 2B:
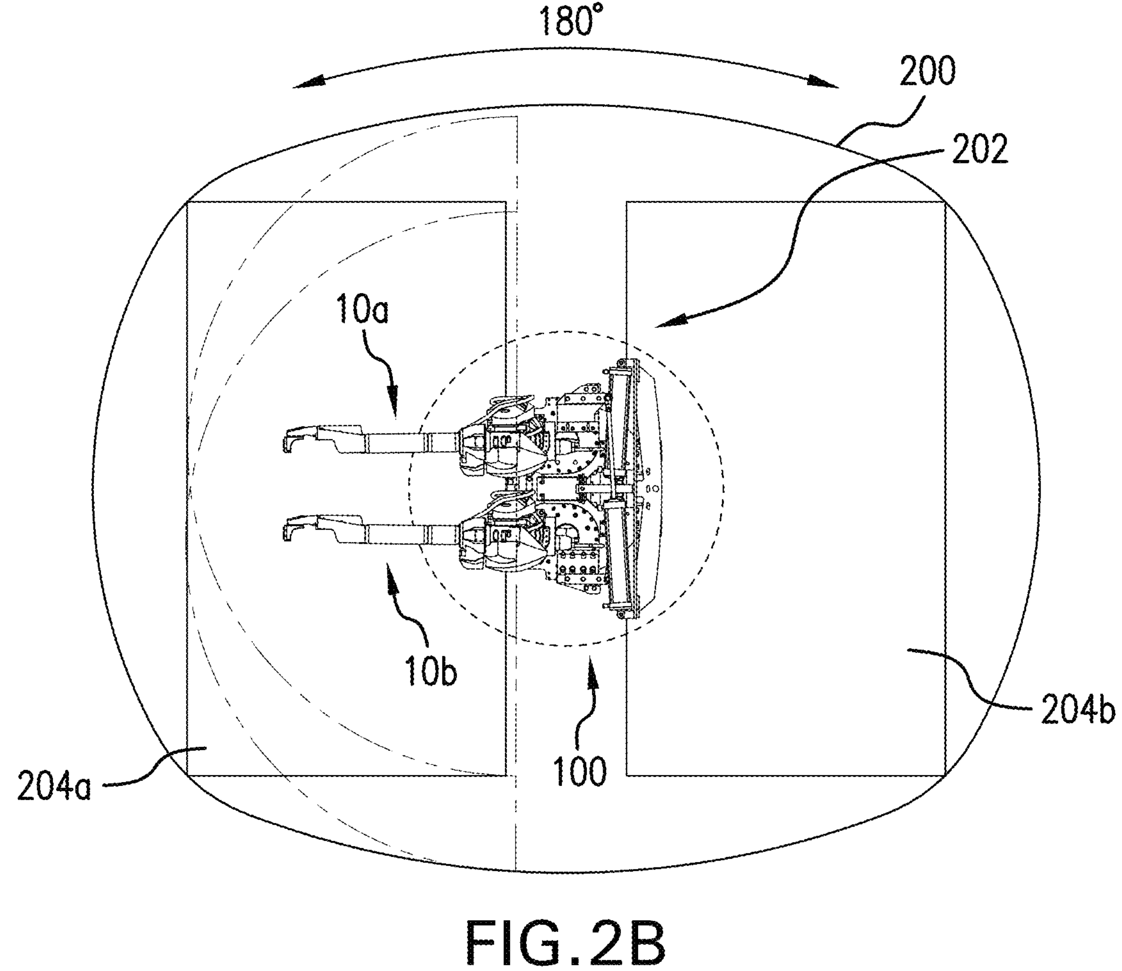
FIG. 2B is a top view of a workstation with the off-center index paddles in in the outward position where the robots are oriented for outward reach of the robotic arm.

At its bottom end 106, riser 104 is mounted to a base 114, which distributes the workstation's weight and ensures stability during operation. Base 114 can be the floor to which it is fixed via bolts or anchors, providing a stationary foundation for high-precision tasks like welding or drilling. Turning briefly to FIGS. 2A, 2B, robotic work station 100 includes rotating positioner table 200. Riser 104 is mounted to base 114 (i.e., the floor) in the center of a giant bearing 202 upon which rotating positioner table 200 is set. Rotating positioner table 200 rotates back and forth one hundred and eighty degrees (180°) between a working position (work cell 204*a*) and an open position (work cell 204*b*). By positioning riser 104 of robotic workstation 100 in the center of positioner table 200, the entire footprint of robotic workstation 100 is reduced.

Top end 108 of riser 104 supports an adapter plate 116, which serves as the mounting platform for the index paddles 102*a*, 102*b*. Adapter plate 116 can be rigidly attached to riser 104 via a top plate 118, typically via welding, bolts, or a keyed interface to prevent rotation or displacement under load. Adapter plate 116 has a surface area extending outward on opposite sides of riser's top end 108, with a perimeter significantly larger than that of the riser's cross-section. This extended surface area provides sufficient space to mount the first bearing 120*a* and second bearing 120*b* off-center on opposite sides of the adapter plate 116, as detailed below, co-axially aligned with corresponding holes 117*a*, 117*b* therein.

A first index paddle 102*a* and a second index paddle 102*b* are provided for corresponding first robotic arm 10*a* and second robotic arm 10*b*. Since the elements of each are the same, for simplicity only the first index paddle 102*a* and corresponding parts will be described. First index paddle 102*a* is rotatably mounted on first bearing 120*a*, which is affixed to adapter plate 116 on a first side, offset from longitudinal axis 103 of riser 104. First bearing 120*a*, preferably a slewing ring or thrust bearing, defines a rotational axis 105*a* of rotation for index paddle 102*a*, enabling smooth and precise movement. First index paddle 102 can comprise of a through-hole 123*a*, which is aligned with rotational axis 105*a* of first bearing 120*a*, which is aligned with hole 117*a* in adapter plate 116. This provides an channel through which to run electrical, pneumatic, hydraulic, and other wiring and cables necessary for robotic arm 10*a*. Alternatively, any cabling can be run from above or behind robotic workstation 100. Index paddle 102*a* includes an extending portion 122*a* that projects radially outward from the center of index paddle 102*a*. Extending portion 122*a* is configured to receive first robotic arm 10*a*, which is rigidly or rotatably mounted thereon via a base flange or collar. Extending portion 122*a* effectively positions the robotic arm 10*a* farther from the riser 104 than the index paddle's 102*a* rotational axis 105*a*, significantly increasing reach of robotic arm 10*a* compared to prior art designs.

A first actuator 124*a* is coupled to first index paddle 102*a* to rotate it with respect to the adapter plate 116. In the illustrated embodiment, first actuator 124*a* comprises a pneumatic cylinder (air cylinder) with a piston rod 125 connected to index paddle 102*a* via a pivot (e.g., a clevis) to a bracket 127 that is attached to index paddle 102*a* to convert linear motion of rod 125 into rotation of index paddle 102*a*. The cylinder of first actuator 124*a* is attached via another pivot (e.g., a clevis) to a vertical plate 129. By using a pivot on the end of rod 125 and the end of the cylinder, first actuator 124*a* pivots out with respect to vertical plate 129 when rod 125 is in the retracted position. Also, it should be noted that first actuator 124*a* is on the opposite side of index paddle 102*a*. Second actuator is not show. An inward stop 135 and an outward stop 133 are positioned to provide hard stops at 0 and 90 degrees to stop the rotation of first index paddle 102*a*.

First actuator 124*a* is configured to rotate index paddle 102*a* through a 90-degree arc, from an inward position (shown in FIG. 2A; e.g., 0 degrees, where the extending portion 158*a* is oriented for inward reach close to riser 104) to an outward position (shown in FIG. 2B; e.g., 90 degrees, where the extending portion 122*a* projects outward to maximize the outward reach of robotic arm 10*a* into the work cell). As seen in these two figures, robotic workstation 100 is centered between two work cells to operate in unison allowing for reloading of one work cell while the other work cell is in operation. In the inward position, robotic arm 10*a* can access areas of the work cell that are inward near riser 104, whereas in the outward position robotic arm 10*a* can reach distant or peripheral areas of the work piece or work cell, enhancing operational flexibility.

Similarly, the second index paddle 102*b* is rotatably mounted on the second bearing 120*b*, affixed to adapter plate 116 on a second side opposite the first bearing 120*a*, also offset from the longitudinal axis of riser 104. As previously stated, second bearing 120*b* mirrors first 120*a*, providing a vertical axis of rotation for index paddle 102*b*. Index paddle 102*b* includes an extending portion 122*b* configured to receive second robotic arm 10*b*. A second actuator 124*b*, preferably a pneumatic cylinder identical to the first, rotates index paddle 102*b* through 90 degrees between inward and outward positions, mirroring the functionality of first index paddle 102*a*.

Robotic arms 10*a*, 10*b* each comprise articulated segments driven by servo motors, with a tool (e.g., welder, drill, gripper) at the distal end, as is conventional in the art. By mounting the arms on extending portions 122*a*, 122*b*, each arm operates within a 90-degree work area around riser 104, combining for a full 180-degree coverage of a cell for robotic workstation 100. The off-center positioning of index paddles 102*a*, 102*b* and the outward projection of extending portions 122*a*, 122*b* in the outward position allow each arm to reach farther into its respective portion of the work cell than a centrally mounted arm, overcoming the radial limitations of the prior art.

Figure 4:
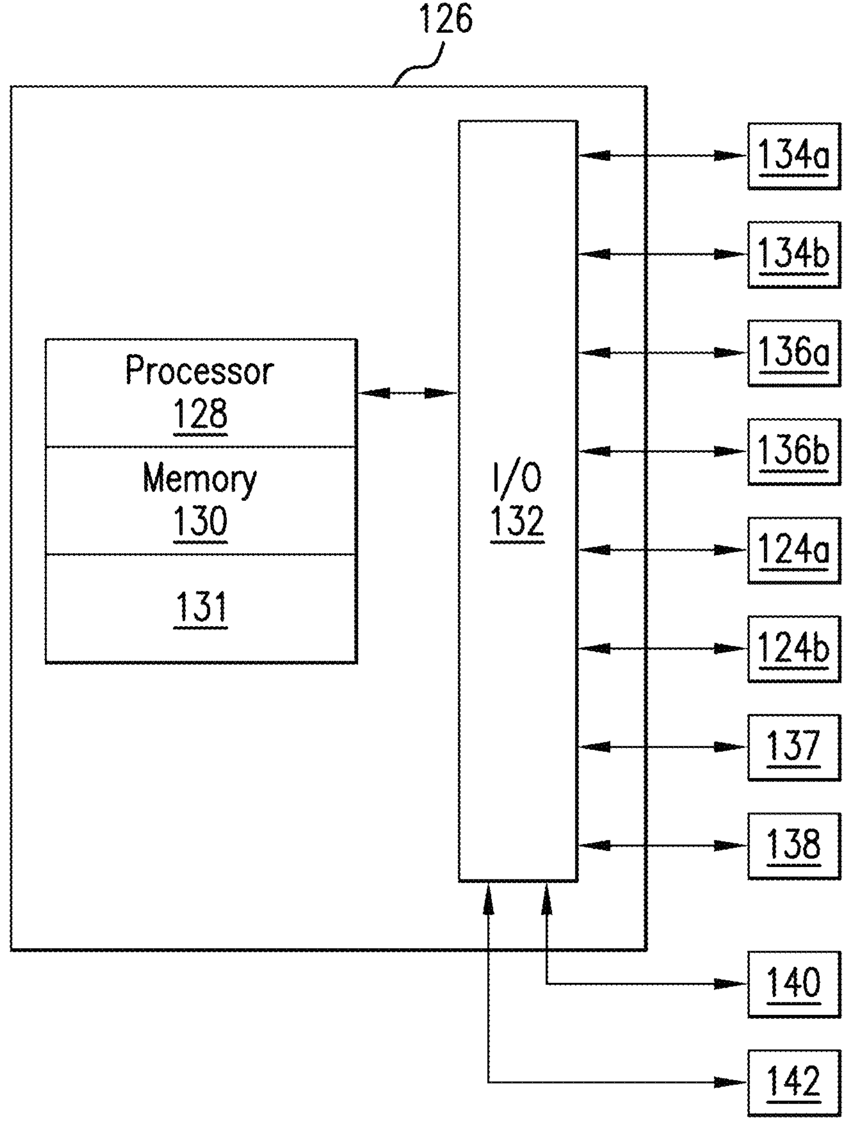
FIG. 4 is a block diagram of a computerized robot controller according to this disclosure.

FIG. 4 shows a computer control system 126, which coordinates rotation of index paddles 102*a*, 102*b* with operation of robotic arms 10*a*, 10*b* to enable continuous and synchronized workflow across two work cells. Computer control system 126 comprises processor 128, memory 130 storing programmed instructions 131, and input/output interfaces 132 for communicating with sensors and actuators. Sensors 134*a*, 134*b*, mounted on or adjacent to index paddles 102*a*, 102*b*, detect rotational position (e.g., 0 or 90 degrees) of each table, providing feedback to computer control system 126 via interfaces 132. Similarly, sensors 136*a*, 136*b* on robotic arms 10*a*, 10*b* monitor arm position, tool status, and servo motor parameters, ensuring precise alignment with workpieces in each work cell. Computer control system 126 is electrically connected to first actuator 124*a* and second actuator 124*b*, controlling actuation to rotate index paddles 102*a*, 102*b* between inward position and outward position. An inward sensor 137 and an outward sensor 138 define the inward and outward position of the respective index paddles 102. Another servo motor 140 and positioning sensors 142 can be used to control the back and forth rotation of positioner table 200.

Alternative embodiments for movement of first index plate 102*a* and second index plate 102*b* that move them between an inward position for the corresponding robotic arm to reach positions proximate to riser 104 and an outward position for extended reach are contemplated.

In alternative embodiment, index paddles 102*a*, 102*b* are configured for linear movement instead of rotation, translating between an inward position and an outward position to achieve equivalent functionality of extended inward and outward reach. In this embodiment, first index paddle 102*a* is mounted on a first linear guide affixed to adapter plate 116 on first side, offset from longitudinal axis of riser 104. First linear guide, preferably comprising pair of parallel rails or linear bearings, defines linear path of translation for index paddle 102*a*, oriented radially outward from riser 104 to maximize inward and outward reach of robotic arm 10*a*. First index paddle 102*a* retains extending portion 122*a*, configured to receive first robotic arm 10*a* via base flange or collar, positioning robotic arm 10*a* farther from riser 104 in the outward position.

First actuator 124*a* comprises pneumatic cylinder anchored to vertical plate 129 with rod of cylinder connected to bracket 127 attached to index paddle 102*a*. In outward position, robotic arm 10*a* can access peripheral or distant areas of workpiece, mirroring rotational embodiment's flexibility. Second index paddle 102*b* and corresponding components are a mirror image.

In another alternative embodiment, index paddle 102*a* is configured to move along arcuate path instead of rotating or translating linearly, enhancing flexibility in positioning robotic arm 10*a*. Arcuate guide, affixed to adapter plate 116 on first side, offset from longitudinal axis of riser 104, comprises curved rail or track defining arcuate path, typically spanning 90 degrees with radius centered near riser 104. Index paddle 102*a*, mounted on arcuate guide via sliders or bearings, retains extending portion 122*a* supporting robotic arm 10*a*. Arcuate actuator, preferably pneumatic cylinder anchored to vertical plate 129 via first clevis and connected to bracket 127, which is attached to index paddle 102*a*, via second clevis drives index paddle 102*a* along arcuate guide between inward position (proximal to riser 104) and outward position (extended outward, maximizing reach of robotic arm 10*a*). This arcuate motion combines benefits of rotation and translation, optimizing reach and clearance in constrained work cells while maintaining continuous operation with second index paddle 102*b*.

It should also be understood that a single robot positioned on a single index paddle can be provided. In one implementation a linearly extending index paddle centrally positioned on round bearing, as previously described can be provided. An actuator can rotate the index paddle 102 through 90 degrees of rotation (or 180 or 360 or through any angle in between those values) around riser 104 with another actuator linearly extending index paddle 102 between an inward and outward position.

Operation of computer control system 126 is programmed to synchronize table rotation and arm movements for continuous operation. For example, when one robotic arm 10*a* is working, the other robotic arm 10*b* can be idle for loading and unloading parts. Alternative embodiments of computer control system 126 include integration with vision systems for workpiece inspection, safety mechanisms, or wireless interfaces for remote programming, enhancing adaptability to complex manufacturing tasks.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A robotic workstation positioned in a center of a pair of rotating work cells, the robotic workstation comprising:

a riser mounted to a base and comprising a top and a bottom;

an adapter plate attached to the top of the riser with a surface area extending outward on opposite sides of the top of the riser to provide a surface area that is larger than a perimeter of the top of the riser;

a first bearing mounted off-center of the adapter plate on a first side of the adapter plate;

a first index paddle rotatably mounted on the first bearing comprising of an extending portion that extends off-center of the first index paddle and configured for receiving a first robotic arm;

a first actuator comprising a first cylinder and a first rod that moves linearly with respect to the first cylinder with the first rod pivotally attached to the first index paddle for rotating the first index paddle with respect to the adapter plate;

a second bearing mounted off-center of the adapter plate on a second side of the adapter plate;

a second index paddle rotatably mounted on the second bearing comprising of an extending portion that extends off-center of the second index paddle and configured for receiving a second robotic arm, wherein a second index paddle movably mounted on a second guide on a second side of the adapter plate, and a second actuator for moving the second index paddle between an inward position and an outward position;

a second actuator comprising a second cylinder and a second rod that moves linearly with respect to the second cylinder with the second rod pivotally attached to the second index paddle for rotating the second index paddle with respect to the adapter plate;

a vertical plate adapted to the adapter plate wherein the first cylinder of the first actuator is pivotally combined with the vertical plate and the second cylinder of the second actuator is pivotally combined to the vertical plate and below the first actuator such that in retracted positions the first actuator and the second actuator are pivoted away from the vertical plate;

wherein the first actuator and the second actuator translates linear extension of the respective first rod and second rod to rotation of the corresponding first index paddle and the second index paddle; and a bearing positioned on the base and having an open center and a rotating portion that rotates with respect to the base, wherein the riser is mounted in the open center of the bearing to the base, and a positioner with a single surface for two work cells mounted on opposite ends of the single surface of the rotating portion of the bearing, wherein the positioner is configured for movement between a working position, wherein the first robotic arm and the second robotic arm can carry out work on a work piece, and an open position, wherein the work piece can be unloaded.

2. The robotic workstation of claim 1, wherein the first actuator and the second actuator are each configured for rotating the corresponding first index paddle and the second index paddle ninety degrees with respect to the adapter plate.

3. The robotic workstation of claim 2, wherein the rotation of the respective first index paddle and the second index paddle ninety degrees with respect to the adapter plate corresponds with moving the first index paddle and the second index paddle between an inward position and an outward position.

4. The robotic workstation of claim 1, wherein the first actuator comprises of an air cylinder.

5. The robotic workstation of claim 1, wherein the adapter plate comprises a first hole aligned with a rotational axis of the first bearing, wherein the first index paddle comprises a through-hole aligned with the rotational axis of the first bearing, and wherein the first hole and the through-hole together define a channel configured to receive wiring for the first robotic arm.

6. The robotic workstation of claim 1, and further comprising a longitudinal axis extending through the riser; a first rotational axis about which the first index paddle rotates; a second rotational axis about which the second index paddle rotates, wherein the first rotational axis and the second rotational axis are each off set from the longitudinal axis on opposite sides thereof.

7. A robotic workstation comprising:

a riser comprising a top and a bottom;

an adapter plate attached to the top of the riser, with a surface area extending outward from the top of the riser to provide the surface area larger than a perimeter of the top of the riser;

a first guide mounted off-center of the adapter plate on a first side of the adapter plate;

a first index paddle movably mounted on the first guide, comprising an extending portion that extends off-center of the first index paddle and configured for receiving a first robotic arm;

a first actuator comprising a first cylinder and a first rod that moves linearly with respect to the first cylinder with the first rod pivotally attached to the first index paddle for moving the first index paddle with respect to the adapter plate between an inward position and an outward position, wherein the extending portion in the outward position projects farther from the riser than in the inward position to extend a reach of the first robotic arm;

a second index paddle movably mounted on a second guide on a second side of the adapter plate, and a second actuator for moving the second index paddle between the inward position and the outward position;

a second actuator comprising a second cylinder and a second rod that moves linearly with respect to the second cylinder with the second rod pivotally attached to the second index paddle for moving the second index paddle with respect to the adapter plate between an inward position and an outward position;

a vertical plate adapted to the adapter plate wherein the first cylinder of the first actuator is pivotally combined with the vertical plate and the second cylinder of the second actuator is pivotally combined to the vertical plate and below the first actuator such that in retracted positions the first actuator and the second actuator are pivoted away from the vertical plate;

wherein the first actuator and the second actuator translates linear extension of the respective first rod and second rod to rotation of the corresponding first index paddle and the second index paddle.

8. The robotic workstation of claim 7, wherein the first actuator is configured to rotate the first index paddle ninety degrees with respect to the adapter plate between the inward position and the outward position.

9. The robotic workstation of claim 7, wherein the first actuator is configured to translate the first index paddle linearly along the first guide with respect to the adapter plate between the inward position and the outward position.

10. The robotic workstation of claim 7, wherein the first actuator is configured to move the first index paddle along an arcuate path defined by the first guide with respect to the adapter plate between the inward position and the outward position.

11. The robotic workstation of claim 7, wherein the first actuator comprises a pneumatic cylinder.

12. The robotic workstation of claim 7, wherein the adapter plate comprises a first hole aligned with the first guide, and the first index paddle comprises a through-hole aligned with the first guide to create a channel for receiving wiring for the first robotic arm.

13. The robotic workstation of claim 7, further comprising a longitudinal axis extending through the riser, and a first movement axis along which the first index paddle moves, wherein the first movement axis is offset from the longitudinal axis.

14. The robotic workstation of claim 7, and further comprising a bearing having an open center and a rotating portion, wherein the riser is mounted in the open center of the bearing, and a positioner mounted on the rotating portion of the bearing, wherein the positioner is configured for movement between a working position, wherein the first robotic arm can carry out work on a work piece, and an open position, wherein the work piece can be unloaded.

15. The robotic workstation of claim 14, wherein the movement between the working position and the open position is one hundred eighty degrees.

16. The robotic workstation of claim 15, wherein a first work cell and a second work cell are mounted on the positioner, and wherein the first work cell and the second work cell rotate back and forth one hundred eighty degrees to periodically position the first work cell and the second work cell in the working position and the open position.

17. The robotic workstation of claim 16, wherein with the work cell in the working position, the first index paddle can move between the inward position and the outward position such the robotic arm can reach an inward area and an outward area of the corresponding first work cell and the second work cell.

* * * * *